(12) United States Patent
Kim

(10) Patent No.: US 7,225,450 B2
(45) Date of Patent: May 29, 2007

(54) DOOR APPARATUS FOR A DISC DRIVE

(75) Inventor: Phil-joong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 10/893,973

(22) Filed: Jul. 20, 2004

(65) Prior Publication Data

US 2005/0034139 A1    Feb. 10, 2005

(30) Foreign Application Priority Data

Aug. 8, 2003    (KR) ...................... 10-2003-0055025

(51) Int. Cl.
G11B 33/02    (2006.01)

(52) U.S. Cl. .................................. 720/647

(58) Field of Classification Search ..................... None
See application file for complete search history.

(56) References Cited

U.S. PATENT DOCUMENTS 5,229,987 A * 7/1993 Aoki .......................... 720/647

5,301,178 A * 4/1994 Okabe et al. ............... 720/649

FOREIGN PATENT DOCUMENTS

| JP | 05-266555 | 10/1993 |
|----|-----------|---------|
| JP | 10-312614 | 11/1998 |

* cited by examiner

Primary Examiner—David Davis
(74) Attorney, Agent, or Firm—Roylance, Abrams, Berdo & Goodman, LLP

(57) ABSTRACT

A door apparatus for causing a pair of doors in a front panel to be opened and closed so that a tray for holding a disc can move into and out of the disc drive. The door apparatus comprises a first door and a second door pivotally located near the front panel. A first lever and a second lever rotate on a hinge shaft and intersect each other such that a distal end of each lever is in contact with a side of the first door and the second door, respectively. A guide bar located on a side of the tray slides between the proximal ends of the first lever and the second lever when the tray moves. The guide bar is inserted between the first lever and the second lever, and causes the distal ends of the first lever and the second lever to separate and to thereby open the doors.

8 Claims, 7 Drawing Sheets

DOOR APPARATUS FOR A DISC DRIVE

BACKGROUND OF THE INVENTION

This application claims the benefit under 35 U.S.C. § 119(a) of Korean Patent Application No. 2003-55025, filed on Aug. 8, 2003, in the Korean Intellectual Property Office, the entire disclosure of which is incorporated herein by reference.

1. Field of the Invention

The present invention relates to a door apparatus of a disc drive. More particularly, the present invention is related to a door opening/closing apparatus of an optical disc drive that solves an eccentricity problem of a door by configuring the door as split type doors.

2. Description of the Related Art

In general, a disc drive is an apparatus which is capable of reading information from or recording information onto a disc-shaped medium such as a compact disc (CD), digital versatile disc (DVD), or the like. Such a disc drive has a tray which is moved typically into and out of a main body of the disc drive in a sliding manner so as to load or unload a disc from the disc drive. A front panel having a doorway through which the tray can move into or out of the main body and a door apparatus for opening or closing the doorway is installed at the front side of the main body. Referring to FIGS. 1A and 1B, a door 16 is attached to the front portion of a tray 12 moves integrally with the tray 12.

In the above structure, when the tray 12 is loaded in the main body 10, the door 16 simultaneously covers the opening of the front panel 14 as shown in FIG. 1A. In addition, when the tray 12 slides out of the main body 10 to be loaded with a disc as shown in FIG. 1B, the opening to the front panel 14 is uncovered at the same time as the door 16 opens and the tray 12 slides out of the main body 10.

In the above disc drive door apparatus, when the tray 12 moves outside the main body 10, the additional weight of the attached door causes the opened tray to decline, thereby placing the tray in an eccentric state. In addition, when the door 16 is designed to have a greater size, a user may be inconvenienced when loading a disc.

Referring to FIGS. 2A and 2B, a door apparatus of a disk drive includes a door 26 attached to a front panel 24 located on the front side of the main body, and a pair of levers 27 which allow the door 26 to pivot. One end of the lever 27 is attached to a surface of the door 26 so that the lever 27 can be an integral part of the door 26, and the other end of the lever 27 is installed at the front panel so that the lever 27 can pivot. A pivot shaft 28 is provided at the other end of the lever 27, and the pivot shaft 28 is coupled to the front panel 24 so that the door 26 can pivot like a hinged door. In addition, a spring (not shown) is inserted around the pivot shaft 28 so that the elastic force of the spring is applied to the door 26 so the door will close against the front panel 24.

In the configuration shown in FIG. 2A, when the tray 22 is loaded in the main body 20, the door 26 is closed against the front panel 24 due to the elastic force of the spring inserted around the pivot shaft 28 of the lever 27. In addition, when the tray 22 begins to slide out of the main body 20 to be loaded with a disc, the tray 22 pushes the inner surface of the door 26 with a force stronger than the elastic force of the spring and pushes open the door 26, as shown in FIG. 2B.

In the above disc drive door apparatus, there is a problem in which the door 26 and the tray 22 may become bent, or due to high temperatures, become deformed, and interfere with each other causing a malfunction during the opening of the door.

SUMMARY OF THE INVENTION

To solve the above-described problems, it is an objective of the present invention to provide a disc drive door opening and closing apparatus capable of improving the eccentricity problem of the cantilevered tray by configuring the door as split type doors, and enhancing the reliability of the disc drive.

Accordingly, to achieve the above object, there is provided a door apparatus for opening and closing the doors in a front panel so that a tray can move into and out of the disc drive. The door apparatus comprises first and second doors located at the front panel and able to pivot to allow the doors to open and close. First and second levers are connected by hinge shafts to allow the levers to pivot on the corresponding hinge shafts. One end of each of the first and second levers is in contact with a side of the first door and the second door, respectively. Guide bars are located on both sides of the tray and slide between the ends of the first levers and the second levers when the tray moves. When the guide bars are inserted between the ends of the first and second levers, the opposite ends of the first and second levers separate, thereby pivoting the first door and the second door in opposite directions to make the doors open.

The door apparatus preferably comprises rotating first rollers and second rollers installed at the other ends of the first levers and the second levers. The guide bars slide between the first rollers and the second rollers when the tray moves.

The door apparatus preferably further comprises first elastic members and second elastic members for exerting elastic forces on the first door and the second door in directions to cause the respective doors to close.

In addition, it is preferable that the first and second projections which are in contact with the respective ends of the first and the second levers are located on both sides of the first door and the second door.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1A:
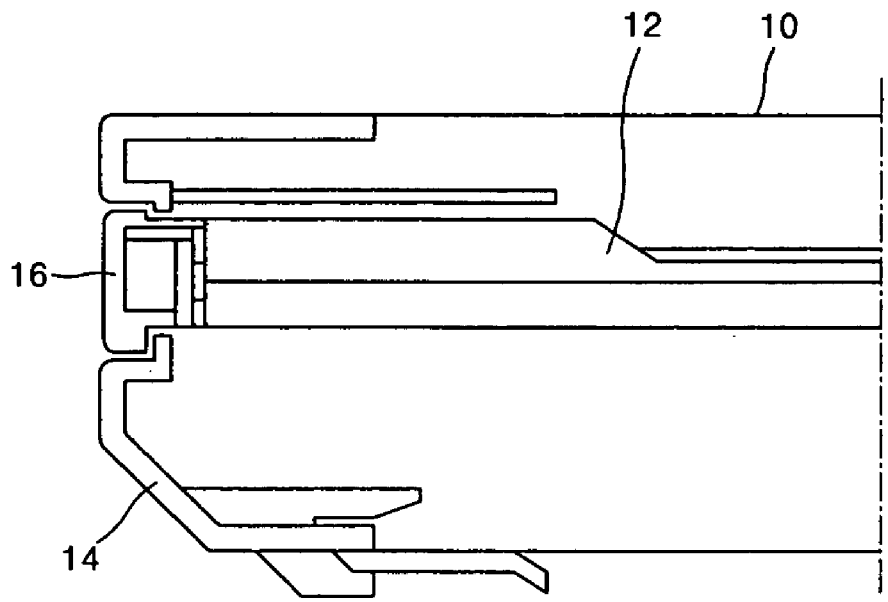
FIGS. 1A and 1B are side sectional views illustrating a conventional door apparatus of a disc drive.
Figure 1B:
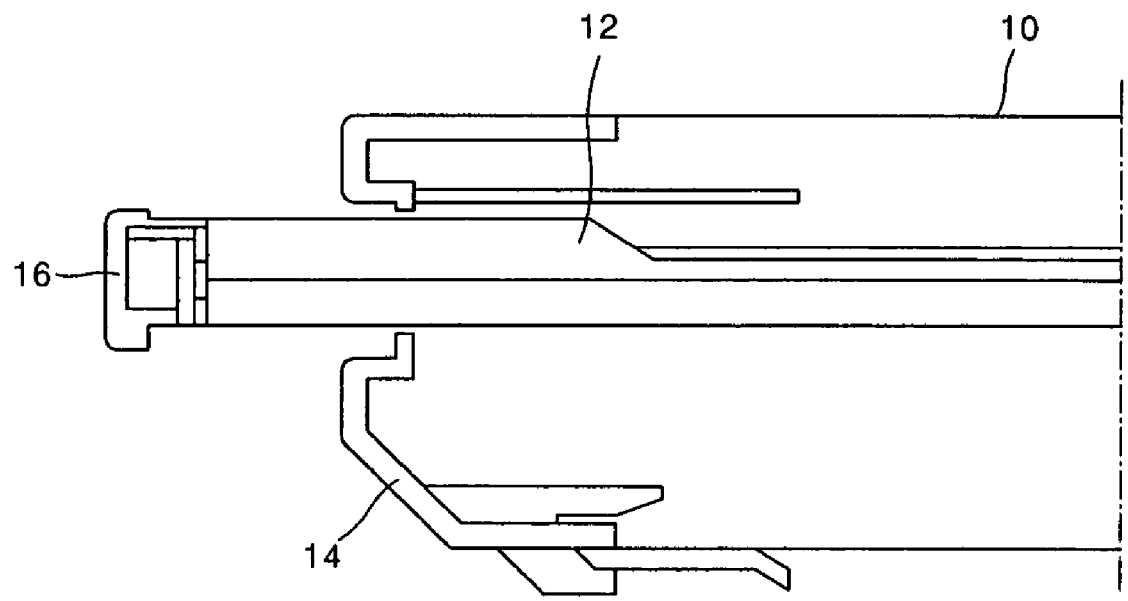
Figure 2A:
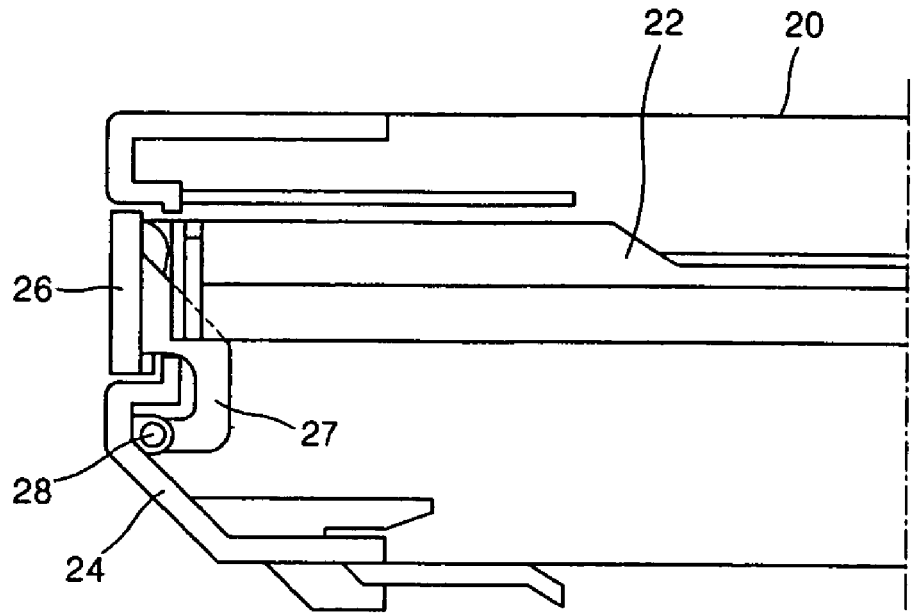
FIGS. 2A and 2B are side sectional views illustrating another conventional door apparatus of a disc drive.
Figure 2B:
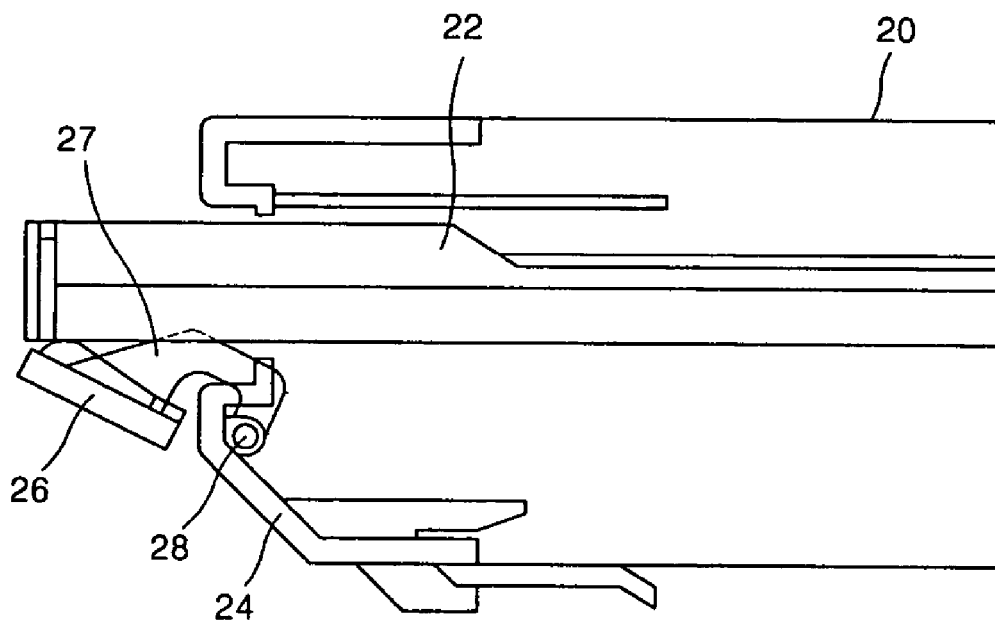
Figure 3:
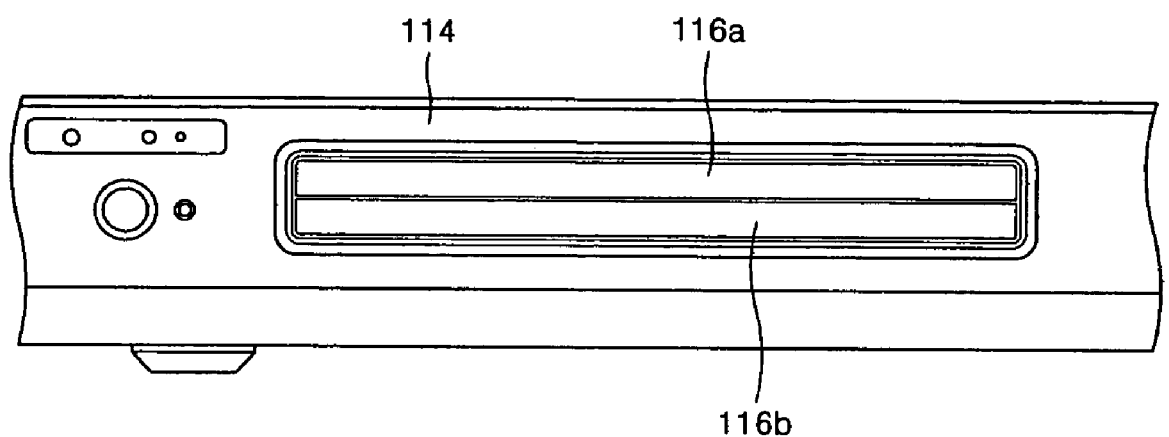
FIG. 3 is a front view illustrating a portion of the front side of a disc drive according to an embodiment of the present invention.

FIG. 3 shows a portion of the front side of a disc drive provided with a door apparatus according to an embodiment of the present invention.

Referring to FIG. 3, a front panel 114 is at the front side of a disc drive, and doors 116a and 116b are located in the front panel 114 so that a tray carrying a disc can be moved in and out.

In addition, the doorway of the front panel 114 is opened and closed as a first door 116a and a second door 116b are opened and closed. Here, as the first door 116a is opened and closed, the upper portion of the doorway is opened and closed, and as the second door 116b is opened and closed, the lower portion of the doorway is opened and closed.

Figure 4:
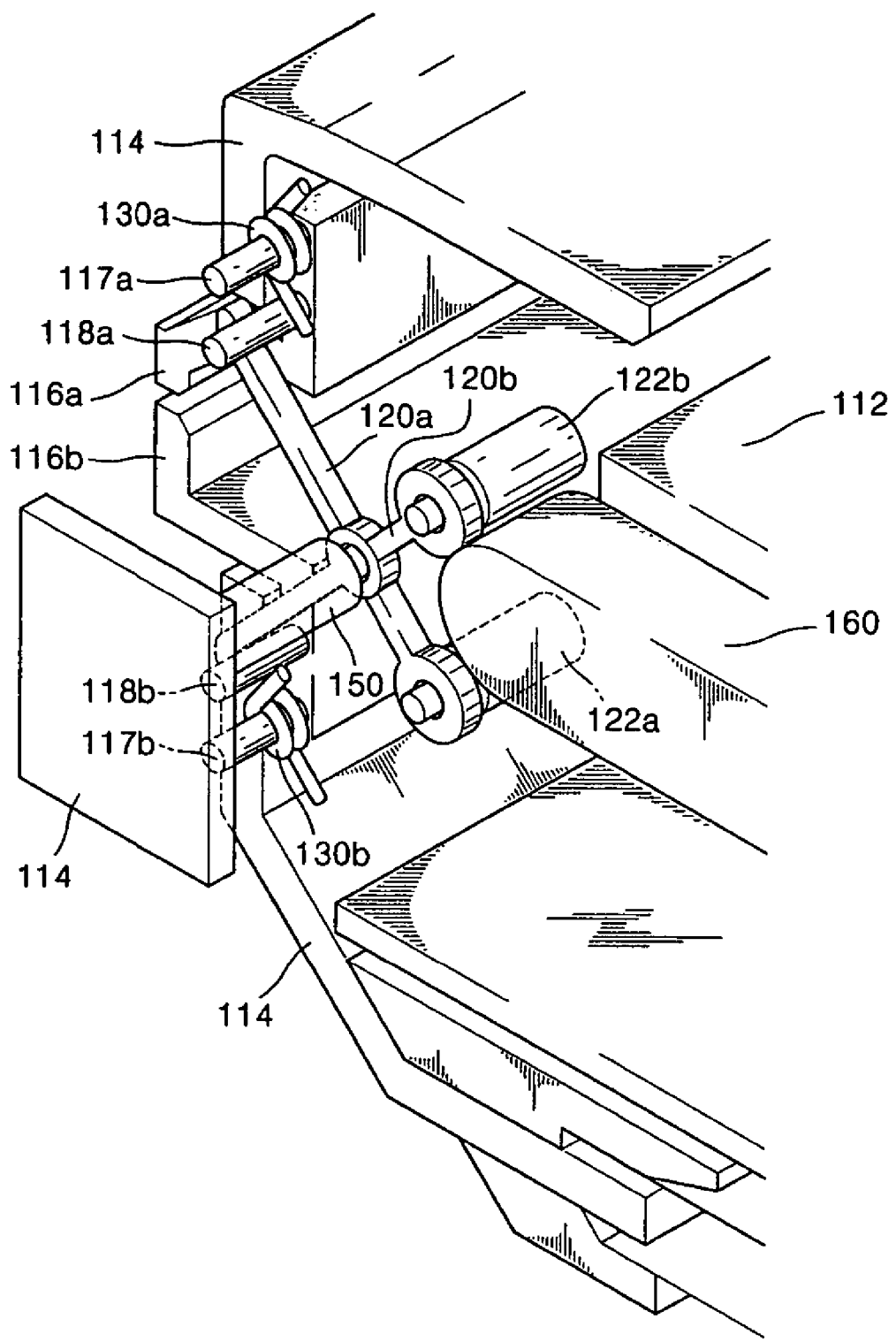
FIGS. 4 and 5 are views illustrating a door apparatus of the disc drive according to an embodiment of the present invention when the doors are in a closed state.
Figure 5:
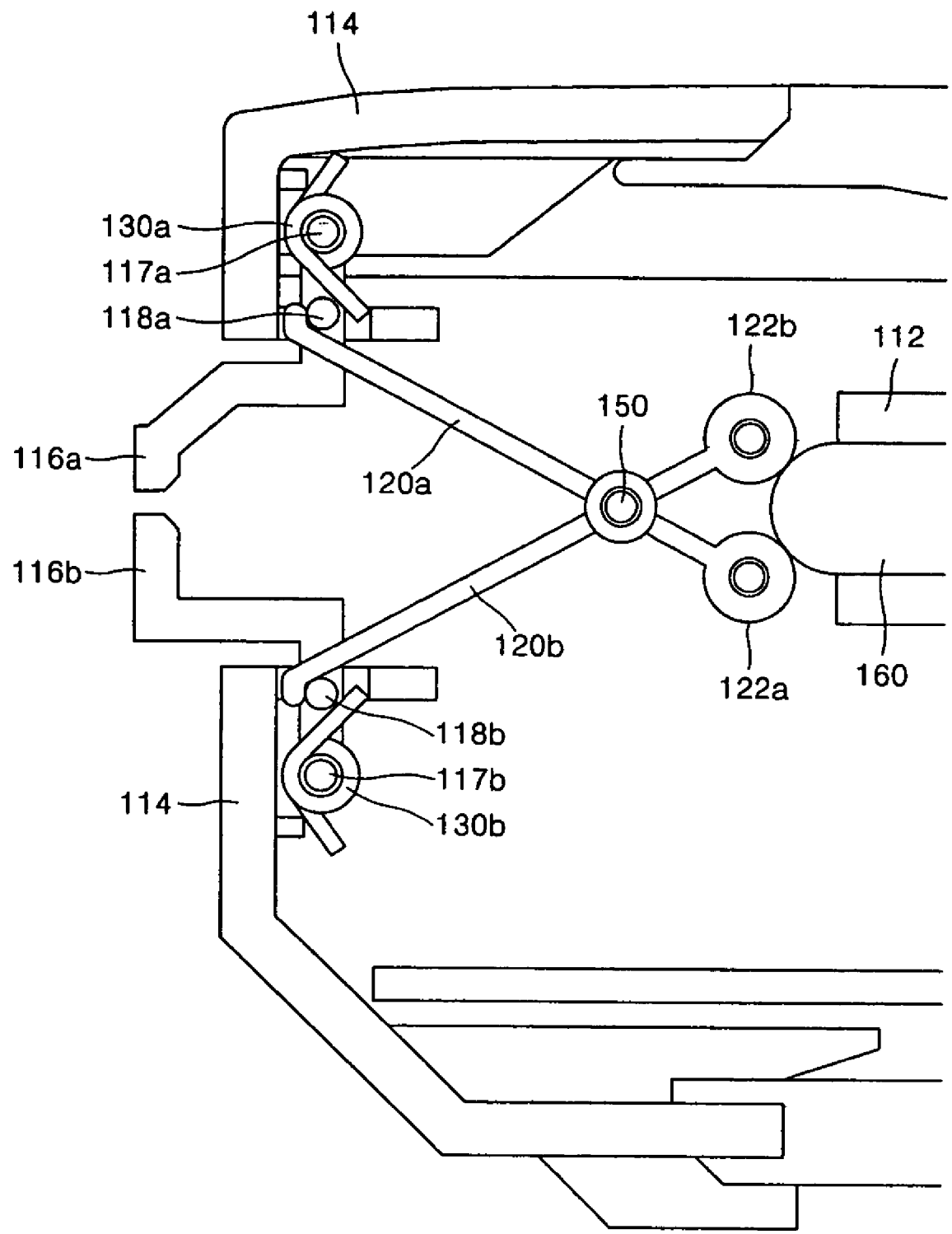

FIGS. 4 and 5 show a door apparatus of the disc drive according to an embodiment of the present invention when doors are closed.

Figure 6:
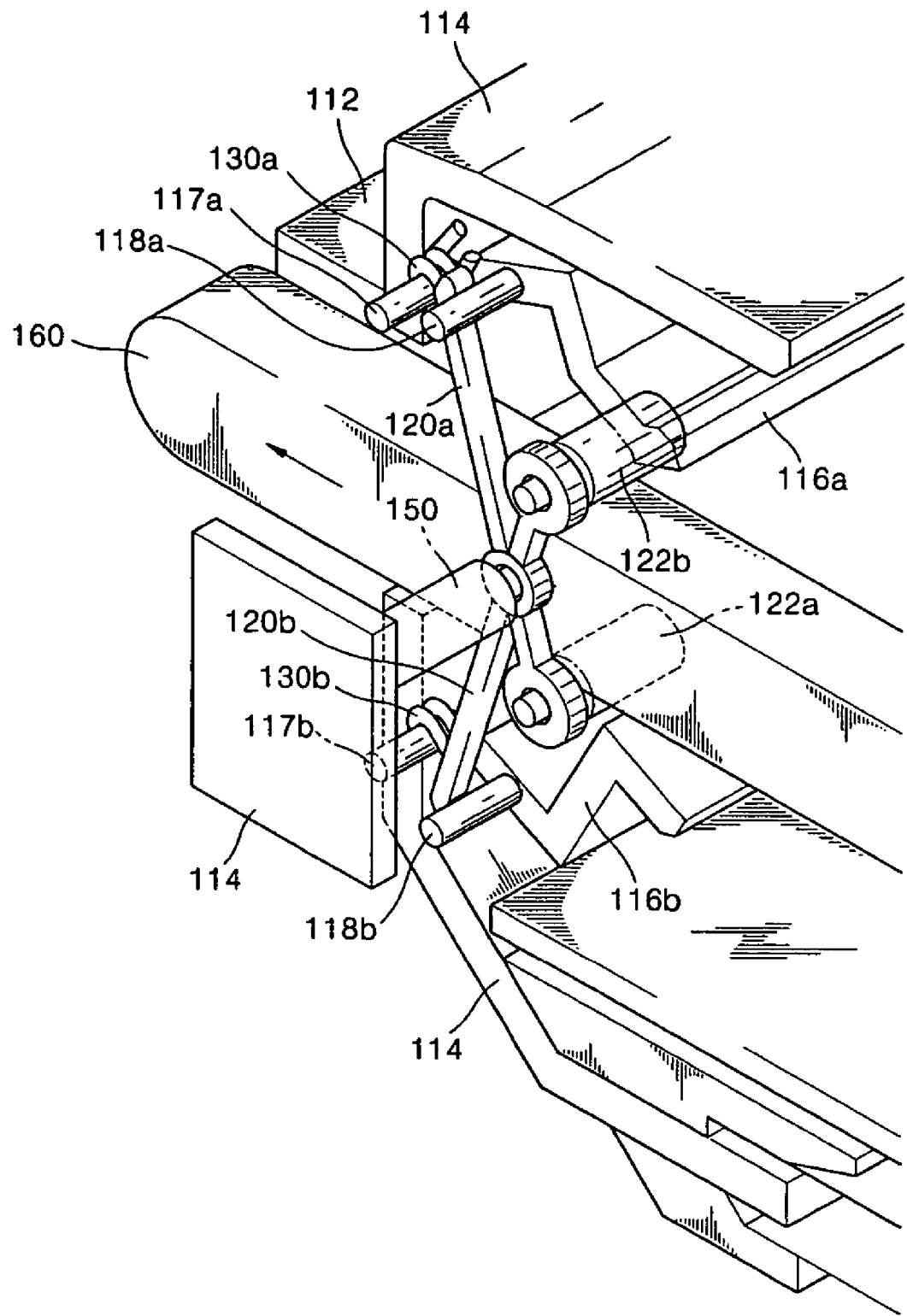
FIGS. 6 and 7 are views illustrating the door apparatus of the disc drive according to an embodiment of the present invention when the doors are in an opened state.
Figure 7:
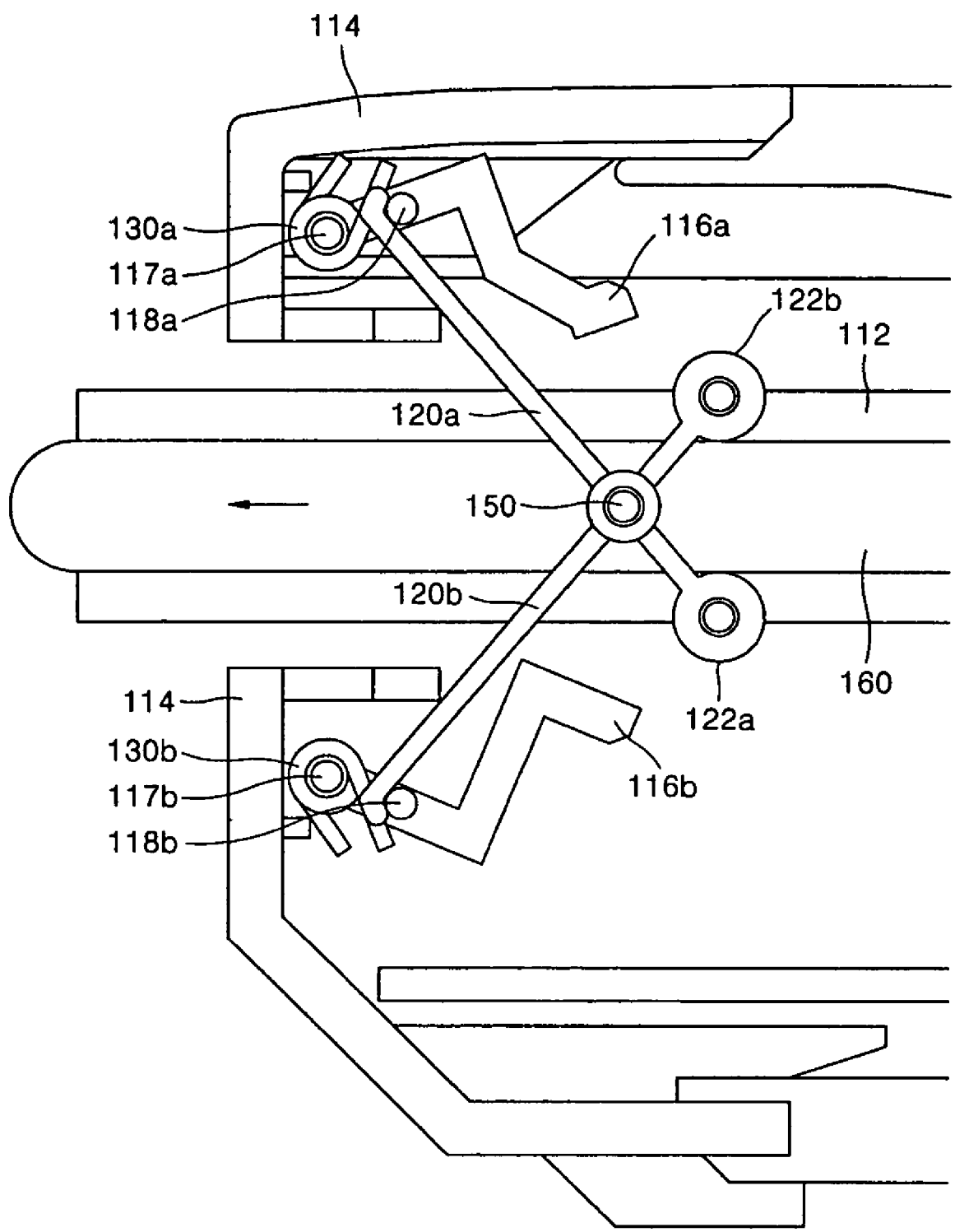

FIGS. 6 and 7 show the door apparatus of the disc drive according to an embodiment of the present invention when the doors are opened.

Here, in the drawings, only one side of the door apparatus is shown as a matter of convenience, but it should be understood that a corresponding portion of the door apparatus is preferably located on the other side of the doors.

Referring to FIG. 5, the door apparatus of a disc drive according to an embodiment of the present invention comprises a first door 116a and a second door 116b which are installed near the front panel 114, and are able to pivot separately. A first lever 120a and a second lever 120b are installed on hinge shaft 150 are actuated by guide bar 160 located on the side of the tray 112.

The first door 116a is installed at an upper portion of the inner wall of the front panel 114 on a first pivot shaft 117a, and the second door 116b is installed at a lower portion of the inner wall of the front panel 114 on a second pivot shaft 117b.

In addition, first and second torsion springs 130a and 130b are fitted on the first and second pivot shafts 117a and 117b. The first and second torsion springs 130a and 130b are elastic members which apply respective elastic forces to the respective first and second doors 116a and 116b in the direction for closing the doors 116a, 116b of the front panel 114. The ends of the first torsion spring 130a are supported by the inner wall of the front panel 114 and by first projection 118a located at the side of the first door 116a. The ends of the second torsion spring 130b are supported by the inner wall of the front panel 114 and second projection 118b located at the side surface of the second door 116b.

The first levers 120a and the second levers 120b are connected to the hinge shaft 150 provided at a side wall of the front panel 114. The first lever 120a and the second lever 120b are configured to pivot on the hinge shaft 150.

In addition, one (distal) end of the first lever 120a is in contact with the first projection 118a located on the side of the first door 116a, and one (distal) end of the second lever 120b is in contact with the second projection 118b located on the side of the second door 116b.

In addition, a rotating first roller 122a is preferably installed at the opposite (proximal) end of the first levers 120a, and a rotating second roller 122b is installed at the opposite (proximal) end of the second lever 120b. Of course, as mentioned above, the similar configuration is preferably found on the opposite sides of the doors 116a and 116b.

A guide bar 160, which slides between the first roller 122a and the second roller 122b when the tray 112 is moved, is preferably installed on either side of the tray 112.

In the above structure, when the tray 112 is completely loaded inside the main body of the disc drive, the guide bar 160 is not between the first roller 112a and the second roller 160, as shown in FIGS. 4 and 5. In this position, the first torsion spring 130a and the second torsion spring 130b which are installed on the first pivot shaft 117a and the second pivot shaft 117b, respectively, apply elastic restoring forces to the first door 116a and the second door 116b. Accordingly, the doors 116a, 116b of the front panel 114 remain closed.

Next, when the tray 112 begins to move toward the front panel 114 to exit from the main body, the guide bar 160 meets the first roller 122a and the second roller 122b which are installed on the other (proximal) ends of the first lever 120a and the second lever 120b. When the tray 112 continues to move forward, the guide bar 160 begins to be inserted between the first roller 122a and the second roller 122b, and the first and the second rollers 122a,122b are pushed downward and upward, respectively, by the guide bar 160 while the rollers 122a 122b rotate. Accordingly, the distal ends of the first lever 120a and the second lever 120b (the ends contacting first and second projections 118a, 118b) are pivoted away from each other, widening the distance between the distal ends of the first lever 120a and the second lever 120b. At this time, since the distal end of the first lever 120a and the second lever 120b are in contact with the first projection 118a and the second projection 118b which are located at the side of the first door 116a and the second door 116b, respectively, the first door 116a and the second door 116b pivot in opposite directions to each other, opening the doors 116a, 116b of the front panel 114. Subsequently, when the tray 112 continues to move forward, the guide bar 160 slides between the first roller 122a and the second roller 122b, as shown in FIGS. 6 and 7, and the tray 112 moves out of the front panel 114.

On the other hand, when the first 116a and second 116b doors are in an open state and the tray 112 begins to return into the main body, the guide bar 160 moves into the main body of the disc drive while sliding between the first roller 122a and the second roller 122b. Subsequently, when the guide bar 160 slides beyond the space between the first roller 122a and the second roller 122b, the first torsion spring 130a and the second torsion spring 130b apply elastic restoring forces to the first door 116a and the second door 116b, respectively, and close the doors 116a, 116b of the front panel 114.

The door apparatus of the disc drive according to an embodiment of the present invention has several advantages.

As described above, for example, the conventional eccentricity problem of the door caused by declination of the tray is improved. Also, a disc drive can be manufactured to allow the doors to be opened and closed as split type doors, and, accordingly, the reliability of the disc drive can be enhanced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A door apparatus of a disc drive for causing a doorway of a front panel to be opened and closed so that a tray mounted therein can move into and out of the disc drive comprising:

a first door and a second door pivotally installed at the front panel to allow the doors to open and close;

a first lever and a second lever which are installed on at least one hinge shaft intersecting one another at said hinge shaft and pivoting on the hinge shaft, wherein the distal ends of the first lever and second lever are in contact with a side of the first door and the second door, respectively; and a guide bar located on a side of the tray, sliding between the proximal end of the first lever and the second lever when the tray moves, wherein when the guide bar is inserted between the proximal end of the first lever and the second lever, the distal ends of the first lever and the second lever separate and, pivot the first door and the second door in opposite directions to open the doors.

2. The door apparatus according to claim 1, wherein first and second rollers are rotatably installed at the proximal ends of the first lever and the second lever, and the guide bar slides between the first roller and the second roller when the tray moves.

3. The door apparatus according to claim 1, wherein the door apparatus further comprises first and second elastic members for exerting elastic forces on the first door and the second door in respective directions causing the doors to close.

4. The door apparatus according to claim 1, wherein first and second projections which are in contact with the respective distal ends of the first and second levers are located on a side of the first door and the second door.

5. A door apparatus of a disc drive for opening and closing doors so that a tray for holding discs can move into and out of the disc drive comprising:

a first door and a second door hinged near a front panel of the disc drive; at least one first lever and at least one second lever, which both pivot around a hinge shaft, wherein each lever has a proximal end and a distal end, wherein the distal end of the at least one first lever contacts the first door and the distal end of the at least one second lever contacts the second door; and at least one guide bar, located on the side of the tray, that slides between the proximal end of the at least first lever and the proximal end of the at least one second lever as the tray moves causing the distal ends of the at least one first lever and at least one second lever to spread apart by pivoting around the hinge shaft, wherein the first and second doors open.

6. The door apparatus according to claim 5, further comprising a first lever roller and a second lever roller connected to the proximal ends of the at least one first lever and the at least one second lever, respectively, wherein the first and second lever rollers rotate as the at least one guide bar slides between the first lever roller and the second lever roller while the tray moves.

7. The door apparatus according to claim 5, further comprising at least on first elastic member and at least one second elastice member connected to the first and second doors, respectively, to bias the first door and second door towards a closed position.

8. A method of for opening and closing the doors of a front panel in a disc drive so that a tray mounted therein can move into and out of the disc drive comprising the steps of:

sliding a guide bar between proximal ends of first and second levers; said levers hinged about a hinge shaft and having distal ends in contact with first and second doors, such that proximal and distal ends separate;

pivoting said first and second doors as the distal ends of the first and second levers separate to open the doors as the tray moves out of the disc drive;

sliding the guide bar from in between proximal ends of said first and second levers causing said proximal and distal ends to move closer together allowing said doors to close.

\* \* \* \* \*